United States Patent
Hucker et al.

(10) Patent No.: US 10,444,089 B2
(45) Date of Patent: Oct. 15, 2019

(54) STRAIN SENSING IN COMPOSITE MATERIALS

(71) Applicant: BAE Systems plc, London (GB)

(72) Inventors: Martyn John Hucker, Filton (GB); David William Gough, Filton (GB)

(73) Assignee: BAE Systems plc, London (GB)

(*) Notice: Subject to any disclaimer, the term of this patent is extended or adjusted under 35 U.S.C. 154(b) by 120 days.

(21) Appl. No.: 15/520,130

(22) PCT Filed: Jan. 30, 2015

(86) PCT No.: PCT/GB2015/050243
§ 371 (c)(1),
(2) Date: Apr. 19, 2017

(87) PCT Pub. No.: WO2016/062995
PCT Pub. Date: Apr. 28, 2016

(65) Prior Publication Data
US 2017/0307454 A1 Oct. 26, 2017

(30) Foreign Application Priority Data

Oct. 20, 2014 (GB) .................................. 1418574.8

(51) Int. Cl.
*G01L 1/18* (2006.01)
*C04B 35/628* (2006.01)
*G01B 7/16* (2006.01)

(52) U.S. Cl.
CPC .......... *G01L 1/18* (2013.01); *C04B 35/62876* (2013.01); *C04B 35/62886* (2013.01);
(Continued)

(58) Field of Classification Search
CPC .... G01B 7/16; G01B 7/18; G01B 7/22; C25B 11/14; H01C 17/232; H01C 17/0652
See application file for complete search history.

(56) References Cited

U.S. PATENT DOCUMENTS 3,622,283 A * 11/1971 Sara .......................... B64C 1/12
428/608
3,807,996 A * 4/1974 Sara ........................ C22C 49/14
205/159
(Continued)

FOREIGN PATENT DOCUMENTS

DE 102006005104 B3 2/2006
EP 1450377 A2 2/2004
(Continued)

OTHER PUBLICATIONS

Kang et al., "Metal-coated carbon fiber for lighter electrical metal wires", Sep. 13, 2016, Synthetic Metals, vol. 222, Part B, pp. 180-185 (Year: 2016).*
(Continued)

*Primary Examiner* — Harshad R Patel
*Assistant Examiner* — Tran M. Tran
(74) *Attorney, Agent, or Firm* — Maine Cernota & Rardin

(57) ABSTRACT

A carbon fiber element comprising a carbon fiber to which a coating is applied that reduces its thermal coefficient of resistivity (TCR) can be included in a fiber reinforced structural component to improve sensing of strain therein by reducing errors arising from temperature variations. A method thereof includes providing, embedded within the structural component, at least one carbon fiber extending across a principle plane of the structural component, the carbon fiber being uniformly coated along its entire length with an electrically conductive material, the coating having a resistance that is equal to the carbon fiber and a TCR that is equal but opposite to the carbon fiber. The strain in the structural component is then determined by measuring changes in the electrical resistance of the carbon fiber element.

12 Claims, 3 Drawing Sheets

(52) U.S. Cl.
CPC ........ *G01B 7/16* (2013.01); *C04B 2235/5248* (2013.01); *C04B 2235/5264* (2013.01)

(56) References Cited

U.S. PATENT DOCUMENTS

| | | | | |
|---|---|---|---|---|
| 3,827,129 A * | 8/1974 | Denham | ............... | B23P 17/04 164/97 |
| 3,864,148 A * | 2/1975 | Maeawa | ............... | C23C 18/163 118/305 |
| 4,083,719 A * | 4/1978 | Arakawa | ............... | C22C 49/14 252/503 |
| 4,104,607 A * | 8/1978 | Jones | ............... | H01C 7/06 29/620 |
| 4,132,828 A * | 1/1979 | Nakamura | ............... | C04B 14/386 419/24 |
| 4,177,376 A * | 12/1979 | Horsma | ............... | H01C 1/1406 174/DIG. 8 |
| 4,252,856 A * | 2/1981 | Sara | ............... | B23K 35/0205 313/355 |
| 4,341,823 A * | 7/1982 | Sexton | ............... | C22C 47/08 427/305 |
| 4,439,303 A * | 3/1984 | Cocchi | ............... | G01N 27/308 204/294 |
| 4,440,571 A * | 4/1984 | Ishikawa | ............... | C03C 25/42 156/279 |
| 4,511,663 A * | 4/1985 | Taylor | ............... | C03C 14/002 264/DIG. 19 |
| 4,661,403 A * | 4/1987 | Morin | ............... | D01F 11/127 205/138 |
| 4,677,413 A * | 6/1987 | Zandman | ............... | H01C 7/06 338/195 |
| 4,680,100 A * | 7/1987 | Morin | ............... | C25B 11/02 204/242 |
| 4,904,351 A * | 2/1990 | Morin | ............... | C25D 7/0607 204/206 |
| 4,907,341 A * | 3/1990 | Chapel, Jr. | ............... | H01C 17/232 219/121.69 |
| 4,909,910 A * | 3/1990 | Morin | ............... | D01F 11/127 205/104 |
| 4,911,797 A * | 3/1990 | Hoebel | ............... | C25D 7/0607 204/206 |
| 4,966,729 A * | 10/1990 | Carmona | ............... | B29C 65/3488 252/503 |
| 5,079,040 A * | 1/1992 | Brandenburger | ... | C23C 18/1893 427/304 |
| 5,171,419 A * | 12/1992 | Wheeler | ............... | C04B 41/009 205/176 |
| 5,379,644 A * | 1/1995 | Yanagida | ............... | G01B 7/18 73/768 |
| 6,097,276 A * | 8/2000 | Van Den Broek | ....... | H01C 7/06 338/22 R |
| 6,211,769 B1 * | 4/2001 | Baldwin | ............... | H01C 7/006 257/E21.004 |
| 6,411,746 B1 * | 6/2002 | Chamberlain | ........ | G02F 1/0115 385/10 |
| 6,936,191 B2 * | 8/2005 | Fox | ............... | C08K 7/06 252/512 |
| 7,060,241 B2 * | 6/2006 | Glatkowski | ............. | B82Y 10/00 423/447.1 |
| 7,278,201 B2 * | 10/2007 | Szwarc | ............... | H01C 7/06 219/121.69 |
| 7,859,385 B2 * | 12/2010 | Bertin | ............... | H01C 7/005 257/414 |
| 8,198,978 B2 | 6/2012 | Schultes | | |
| 8,451,013 B1 | 5/2013 | Hsiao | | |
| 8,466,392 B2 * | 6/2013 | O'Connor | ............... | H05B 3/145 219/537 |
| 8,534,133 B2 * | 9/2013 | Hucker | ............... | B29C 70/10 73/760 |
| 8,796,553 B2 * | 8/2014 | Hucker | ............... | B29C 70/10 174/126.2 |
| 9,129,744 B2 * | 9/2015 | Hucker | ............... | H01G 9/004 |
| 9,165,701 B2 * | 10/2015 | Chu | ............... | H01C 7/021 |
| 9,669,937 B2 * | 6/2017 | Lengsfeld | ............. | B29C 70/882 |
| 2001/0051212 A1 * | 12/2001 | Tani | ............... | H01C 17/232 427/123 |
| 2003/0090021 A1 * | 5/2003 | Kise | ............... | B29C 43/003 264/113 |
| 2005/0181209 A1 * | 8/2005 | Karandikar | ............ | B22F 3/1103 428/408 |
| 2009/0075088 A1 | 3/2009 | Vaidyanathan | | |

FOREIGN PATENT DOCUMENTS

| | | |
|---|---|---|
| EP | 2431412 A1 | 9/2010 |
| GB | 2503213 A | 12/2013 |
| WO | 2005115729 A1 | 12/2005 |
| WO | 2009118509 A1 | 10/2009 |
| WO | 2010004323 A1 | 1/2010 |
| WO | 2010004324 A1 | 1/2010 |
| WO | 2014144532 A1 | 9/2014 |

OTHER PUBLICATIONS

Great Britain Search Report for Application No. GB1418574.8, dated Feb. 19, 2015, 2 pages.
Great Britain Search Report for Application No. GB1418574.8, dated Feb. 3, 2015, 5 pages.
International Search Report and Written Opinion for PCT Application No. PCT/GB2015/050243, dated Jun. 1, 2015, 13 pages.
Yuzun Fan et al: "Metallization of Carbon Fibers with Nickel by Electroless Plating Technique", Metallurgical and Materials Transactions A, Springer-Verlag, New York, vol. 38, No. 9, Jul. 28, 2007, pp. 2148-2152.
International Preliminary Report on Patentability and Written Opinion for Appl No. PCT/GB2015/050243 dated Apr. 25, 2017, 9 pages.

* cited by examiner

STRAIN SENSING IN COMPOSITE MATERIALS

RELATED APPLICATIONS

This application is a national phase application filed under 35 USC § 371 of PCT Application No. PCT/GB2015/050243 with an International filing date of Jan. 30, 2015 which claims priority of GB Patent Application 1418574.8 filed Oct. 20, 2014. Each of these applications is herein incorporated by reference in its entirety for all purposes.

FIELD OF THE INVENTION

This invention relates generally to strain sensing in composite materials and, more particularly, to carbon fibre strain sensing in composite structural materials for use in structural health monitoring systems, wherein the intrinsic self-sensing properties of materials are used to measure strain.

BACKGROUND OF THE INVENTION

Self-sensing refers to the ability of a material, typically a structural material, to sense its own condition. Strain sensing is a key function in structural control and numerous types of strain sensor are available, including optical fibres, piezoelectric sensors, electrostrictive sensors, magnetostrictive sensors and piezoresistive sensors.

Composite materials including fibre reinforcements, such as carbon fibre reinforced polymers (CFRP) and glass fibre reinforced polymers (GFRP), have become relatively commonly-used structural materials. Among the various types of fibre proposed for this purpose, carbon fibre in particular has become increasingly dominant, due to its high strength, high modulus, low density, and temperature resistance. As a result, CFRP composite materials are gaining wider use across a number of industries.

Carbon fibres are electrically conductive, and a change in their electrical resistance occurs in response to strain. It has, therefore, been proposed to use self-sensing strain measurement in carbon fibre reinforced materials by exploiting the strain/resistance response of carbon fibres, thereby eliminating the need for conventional embedded or attached sensors for the purpose of structural control, and resulting in reduced cost, greater durability, larger sensing volume, and absence of mechanical property degradation (due to embedded sensors).

Thus, referring to FIG. 1 of the drawings, a typical example of a fibre reinforced polymer material 100 comprises a resin substrate 102 having embedded therein a plurality of elongate carbon fibres or carbon fibre 'tows' 104, which may be arranged in substantially parallel, side-by-side configuration across the principal plane of the material, and in several different alternative orientations and configurations, as illustrated in FIGS. 1 a), b), c) and d) respectively. A carbon fibre tow typically comprises a substantially flat 'ribbon' or bundle of fibres, which may be 'woven' or otherwise interlinked, wherein the fibres may all comprise carbon, but may equally comprise a mixture of fibres, such as glass, ceramic, Kevlar, or the like, and include one or more carbon fibres therein.

Referring to FIG. 2 of the drawings, if strain sensing is to be performed using the strain/resistance response of the carbon fibres, the fibres or tows 104 is typically insulated each other by means of respective insulative (e.g. glass) layers or 'blankets' 106, in order to prevent short circuiting between adjacent fibres or tows. The ends of one or more carbon fibres 104 are made accessible externally of the polymer substrate 102, and electrical contacts 108 are coupled thereto, by means of which strain sensing can be performed. There are many known ways of measuring the resistance of an electrical component, and by way of example only, in some systems, a fixed current is applied to the carbon fibre(s) and the resultant voltage drop across it is measured such that, by means of Ohm's law, the resistance of the fibre(s) can be determined.

However, it has been discovered by the inventors that temperature changes represent a potentially significant source of error in strain measurements due to the thermoresistive response of carbon fibres. For example, the inventors have determined that a change in temperature of +10° C. can result in an apparent strain error of 1500-2000 microstrain (tensile). Typical design strains for CFRP structures are of the order of 2000-6000 microstrain and typical tensile failure strains are of the order of 10,000-15,000 microstrain. It can thus be seen that measurement error caused by temperature fluctuation can result in a significant percentage error in strain measurements in structural materials of this type.

As a result, the use of carbon fibre strain sensors is limited to dynamic measurements on structures with thermal time constants significantly longer than the dynamic response rate of interest, in many practical applications. Indeed, known carbon fibre strain sensors can only provide reliable absolute strain data in cases where the structure is isolated from temperature variations (e.g. laboratory tests). On the other hand, air platforms, for example, are expected to operate across a wide range of temperatures, typically ranging from −55° C. to at least 80° C.

It would, therefore, be desirable to provide a strain sensing arrangement which provides absolute resistance measurements and, therefore, absolute strain data for most practical applications, in a manner that can be integrated with realistic components and structures, and aspects of the present invention seek to address at least some of these issues.

SUMMARY OF THE INVENTION

According to one aspect of the present invention, there is provided a method of sensing strain in a structural component, the method comprising the steps of:
  providing, embedded within said structural component, at least one carbon fibre element coated with an electrically conductive material;
  measuring the electrical resistance of said coated carbon fibre element; and
  determining strain in respect of said carbon fibre element based on changes in said electrical resistance thereof.

Carbon fibre elements which are coated with an electrically conductive material are known, and are used in the art for enabling electromagnetic screening of components. Thus, such coated carbon fibre elements are designed such that the electrical conductivity of the coating is as high as possible and, therefore, as thick as possible. In contrast, in some aspects of the method of the present invention, the coating is designed such that the material used has a thermal coefficient of resistance with an opposite sign to that of the underlying carbon fibre, and a magnitude which is as closely matched to that of the carbon fibre as possible. Furthermore, in some aspects, the thickness of the coating layer is designed such that its resistance per unit length is matched as closely as possible to that of the underlying carbon fibre.

In this way, strain sensing errors resulting from the thermoresistive response of carbon fibre can be significantly reduced.

In exemplary embodiments of the invention, the compensating coating is applied directly to the carbon fibre(s), and is effectively connected in parallel with the carbon fibre "sensor", with its properties being selected such that the combined thermal response of the overall sensor is reduced or cancelled out in its entirety. The strain response of the sensor is almost entirely geometric in origin (i.e. the materials used display negligible piezoresistance), and the coating material(s) may be selected to exhibit similar behaviour (i.e. negligible piezoresistance), such that a carbon fibre sensing tow can be provided that has a useable strain response combined with minimal thermal drift.

Typical coating materials are metals and metal alloys. In one exemplary embodiment, the coating material may comprise a copper/nickel alloy, for example, a ~75% copper/25% nickel alloy, which may be provided on the outer surface of one or more carbon fibres by means of, for example, electroplating. In another exemplary embodiment, the coating material may comprise electroless nickel plate, for example, a medium-phosphorous (7-9%) electroless nickel plate.

According to another aspect of the present invention, there is provided a method of manufacturing a carbon fibre element for a carbon fibre reinforced structural component, the method comprising the steps of:
providing at least one carbon fibre;
selecting an electrically conductive material having a thermal coefficient of resistance which is of opposite sign and substantially equal magnitude to that of said carbon fibre; and
coating said carbon fibre with a layer of said electrically conductive material.

In one exemplary embodiment, the thickness of said layer of electrically conductive material is selected such that the resistance per unit length of said electrically conductive layer is substantially equal to that of said carbon fibre.

It will be appreciated by a person skilled in the art that the term "substantially equal" used above refers primarily to the intention of the claimed manufacturing process, rather than the physical reality. In reality, whilst there is the intention to provide an electrically conductive coating on the carbon fibre element which has a substantially equal and opposite thermal coefficient of resistance and a substantially equal resistance per unit length, which would provide the ideal response; in reality, and taking into account various physical and manufacturing constraints, the resultant coating in some cases would be more accurately described as "closely matching" said thermal coefficient of resistance magnitude and resistance per unit length of the underlying carbon fibre, with "closely matching" being, for example, within 25% of the corresponding carbon fibre parameter and, more preferably, within about 10% of the corresponding carbon fibre parameter.

The electrically conductive material may be a metal or metal alloy. In some exemplary embodiments of the invention, the electrically conductive material comprises or includes nickel. The electrically conductive material may comprise a nickel-copper alloy or phosphorous nickel plate, and the coating step may comprise, for example, electroplating or electroless nickel plating.

Aspects of the present invention extend to carbon fibre element for use in a carbon fibre reinforced structural component, said carbon fibre element being manufactured in accordance with the method described above.

Further aspects of the present invention extend to a carbon fibre reinforced structural component, including at least one carbon fibre element manufactured in accordance with the method described above.

Although illustrative embodiments of the invention are described in detail herein with reference to the accompanying drawings, it is to be understood that the invention is not limited to these precise embodiments.

Furthermore, it is contemplated that a particular feature described either individually or as part of an embodiment can be combined with other individually described features, or parts of embodiments, even if the other features and embodiments make no mention of the particular feature. Thus, the invention extends to such specific combinations not already described.

BRIEF DESCRIPTION OF THE DRAWINGS

Embodiments of the present invention will now be described, by way of examples only, and with reference to the accompanying drawings, in which.

DETAILED DESCRIPTION

Figure 1:
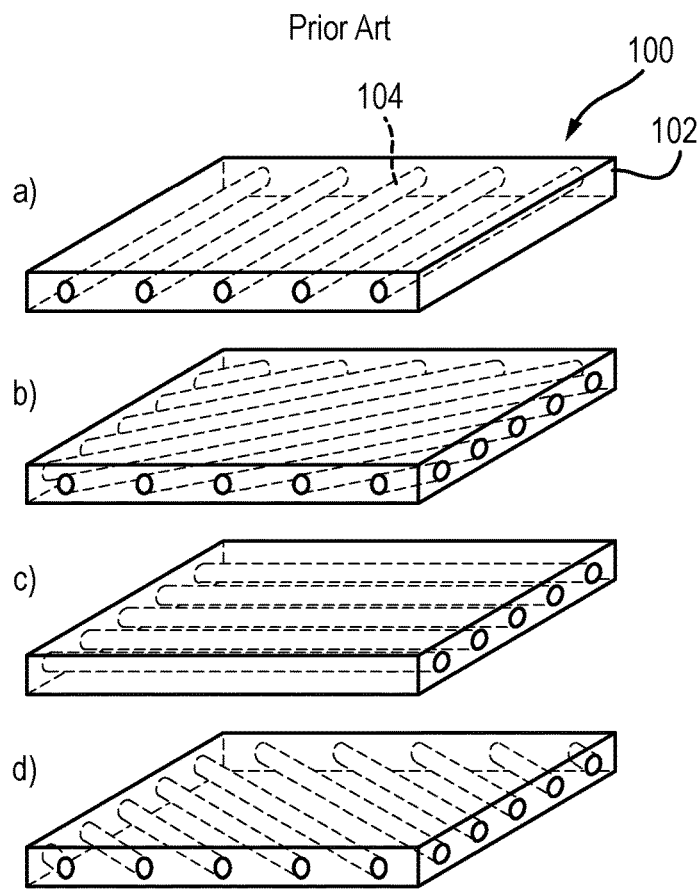
FIG. 1 is a schematic diagram illustrating the structure of a fibre reinforced polymer material according to the prior art.
Figure 2:
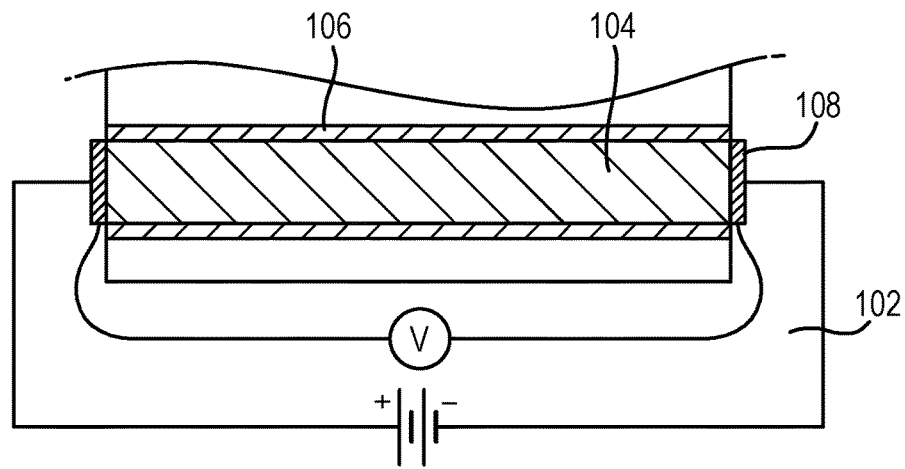
FIG. 2 is a schematic cross sectional view of a fibre reinforced material and strain sensing arrangement according to the prior art.

Thus, embodiments of the present invention provide a fibre reinforced substrate in which at least one of the fibres is a carbon fibre coated with a conductive material which has a thermal coefficient of resistance (TCR) which is of opposite sign and at least closely matched magnitude to that of the underlying carbon fibre, and which has a thickness selected such that its resistance per unit length at least closely matches that of the underlying carbon fibre.

Numerous methods of plating or coating individual carbon fibres and carbon fibre tows have been proposed, and it is envisaged that many of these could be used to produce the metal-coated carbon fibres for use in embodiments of the present invention.

For example, electroplating can be used to coat carbon fibre filaments or a carbon fibre tow, by using electrical current to reduce dissolved metal cations so that they form a coherent metal coating on an electrode (i.e. in this case, the carbon fibre).

An alternative coating method is known as electroless nickel plating which is an autocatalytic chemical technique used to deposit a layer of nickel-phosphorous or nickel-boron alloy on a substrate (in this case, a carbon fibre filament or tow). The process relies on the presence of a reducing agent, for example, hydrated sodium hypophosphite ($NaPO_2H_2.H_2O$), which reacts with the metal ions to deposit material. Thus, unlike electroplating, it is not necessary to pass an electric current through the solution to form a deposit. Deposition of alloys with different percentages of phosphorus are possible, and the metallurgical properties of alloys tend to depend primarily on the percentage of phosphorous. In this regard, low, medium and high phosphorous electroless nickel are all general terms commonly used in the art, and properties of electroless nickel-phosphorous alloys are provided, for example, by Norio Miura, et al in "Electroless Nickel Resistors Formed in IMST Substrate", IEEE Transactions on Components, Hybrids and Manufacturing Technology, Vol. CHMT-4, No. 4, December 1981.

It will be appreciated that other methods of coating a carbon fibre filament, or a tow containing one or more carbon fibre filaments, will be known to a person skilled in the art, and the present invention is not necessarily intended to be limited in this regard.

It will be further appreciated that the present invention is not necessarily intended to be limited in respect of the conductive material used for the coating. The coating material selected is dependent on the thermal coefficient of resistance (TCR) of the underlying carbon fibre, and/or the thickness of the coating is dependent on the resistance per unit length of the underlying carbon fibre, since either or both of these coating parameters are intended to at least closely match the corresponding parameter of the carbon fibre.

Thermal Coefficient of Resistance (TCR)

The thermal coefficient of resistance is an inherent property of electrically conductive materials, and refers to their relative change of electrical resistance as their temperature changes. A positive ~TCR refers to materials that experience an increase in resistance when their temperature is raised, and a negative TCR refers to materials that experience a decrease in electrical resistance when their temperature is raised. Some known carbon fibres, for example, have been found to have a TCR of about −0.03%/° C., indicating that for each increase in temperature by 1° C., there is a resultant decrease in electrical resistance of about 0.03%.

Resistance per Unit Length

Resistance per unit length of a material is dependent primarily on the resistivity ρ of the material, and its cross-sectional area. Resistivity is an intrinsic property of a material that quantifies how strongly it opposes the flow of electric current.

Figure 3:
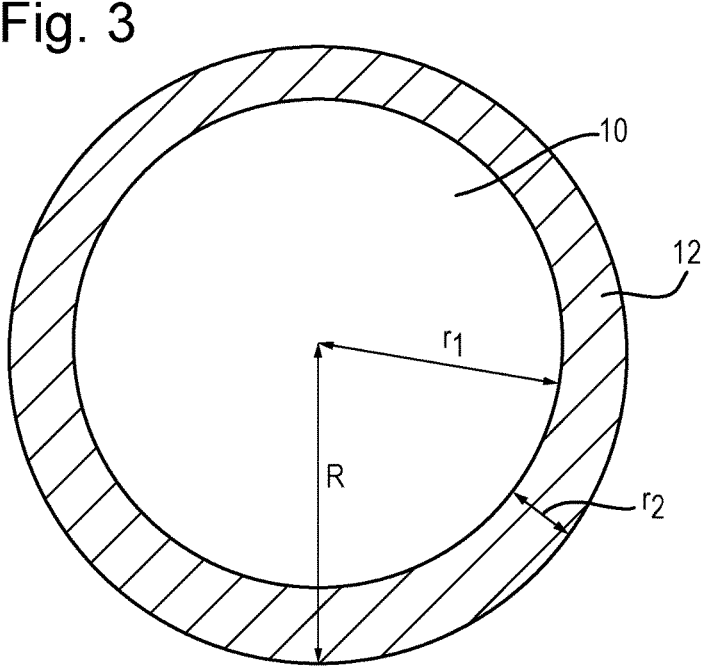
FIG. 3 is a schematic cross-sectional diagram illustrating a coated carbon fibre filament according to an exemplary embodiment of the invention.

Referring to FIG. 3 of the drawings, a carbon fibre filament 10 having a conductive coating 12 is shown schematically in cross-section.

$$\text{Resistance per unit length} = \frac{\rho}{A}$$

where ρ=resistivity (in Ω·m) and A=cross-sectional area (in m²). Thus, if a specific resistance per unit is required to be achieved for the coating, then, given its intrinsic resistivity, the cross sectional area can be selected accordingly. It can be seen from FIG. 3 that the cross-sectional area is dependent on the thickness $r_2$ of the coating 12. If the radius of the coated fibre is R and the radius of the carbon fibre filament is $r_1$ (which is known), then:

$$A_{coating} = \pi R^2 - \pi r_1^2$$

where:

$$R = r_1 + r_2$$

Thus, given that $r_1$ is known, it is possible to select the thickness $r_2$ of the coating 12 (which has a known resistivity ρ) to give a desired cross-sectional area A, thereby resulting in a coating of a desired resistance per unit length.

Figure 6:
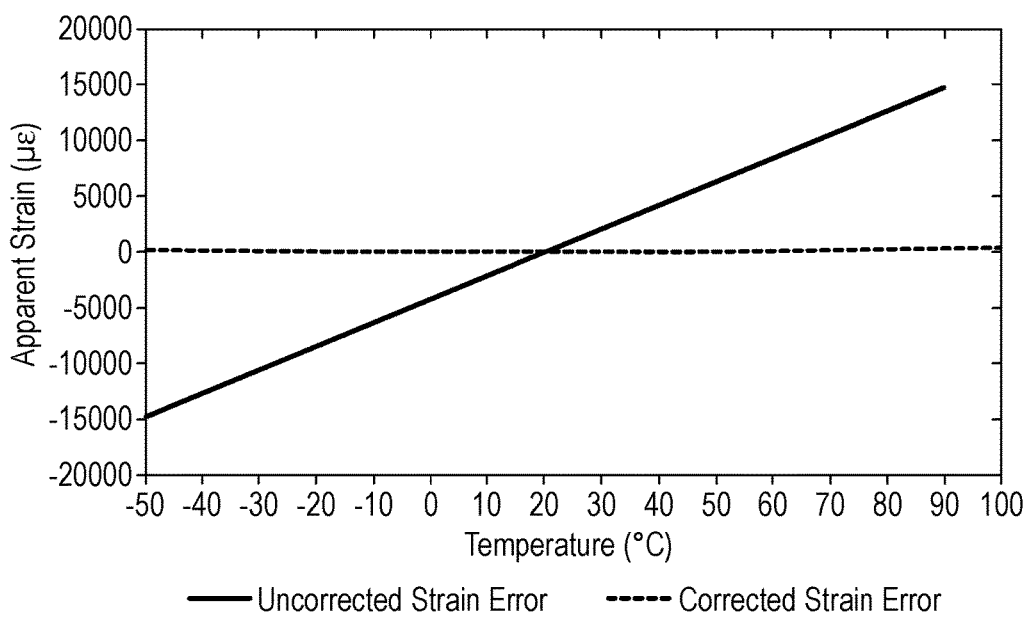
FIG. 6 is a graphical representation illustrating the modelled strain error response of plain carbon fibre tows and thermally compensated tows, based on equal and opposite TCR and matched resistance per unit length.

Referring to FIG. 6 of the drawings, there is illustrated graphically the predicted strain errors across a typical air platform temperature range for conventional and thermally compensated carbon fibre tows, wherein a thermally compensated sensor employs a coating with substantially equal and opposite TCR and substantially matching resistance per unit length. As shown, the maximum strain error can be reduced from +/−15000 microstrain to less than +/−400 microstrain.

Specific examples will now be provided by way of illustration only, but it will be appreciated by a person skilled in the art that numerous modifications and variations in coating materials, coating methods and coating thicknesses are possible, according to the claimed invention, and the present invention is not in any way intended to be limited hereby.

Example 1

Figure 4:
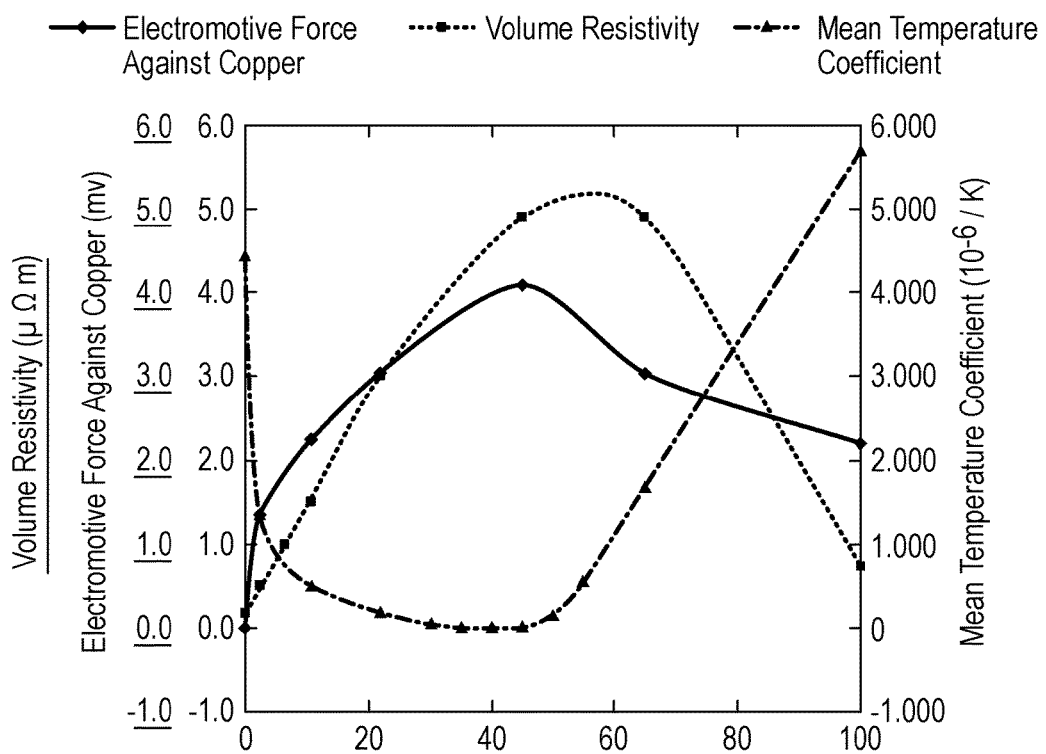
FIG. 4 is a graphical representation illustrating the thermal coefficient of resistance for copper-nickel alloys.

Carbon fibre filament with TCR ~+0.03%/° C. and diameter ~6 μm;
Coating material: ~75% copper/25% nickel with a TCR of ~+0.03%/° C., and ρ ~3×10⁻⁸ Ωm;
Method of Coating: Electroplating
FIG. 4 illustrates graphically the TCR for copper/nickel alloys, showing that 75/25 Cu/Ni gives a TCR of ~+0.03%/° C.

As discussed above, the thickness of the coating is selected such that the resistance per unit length is substantially the same, or at least closely matched, to that of the underlying carbon fibre. Some or all of the carbon fibres may be coated to give a range of compensation profiles.

Example 2

Figure 5:
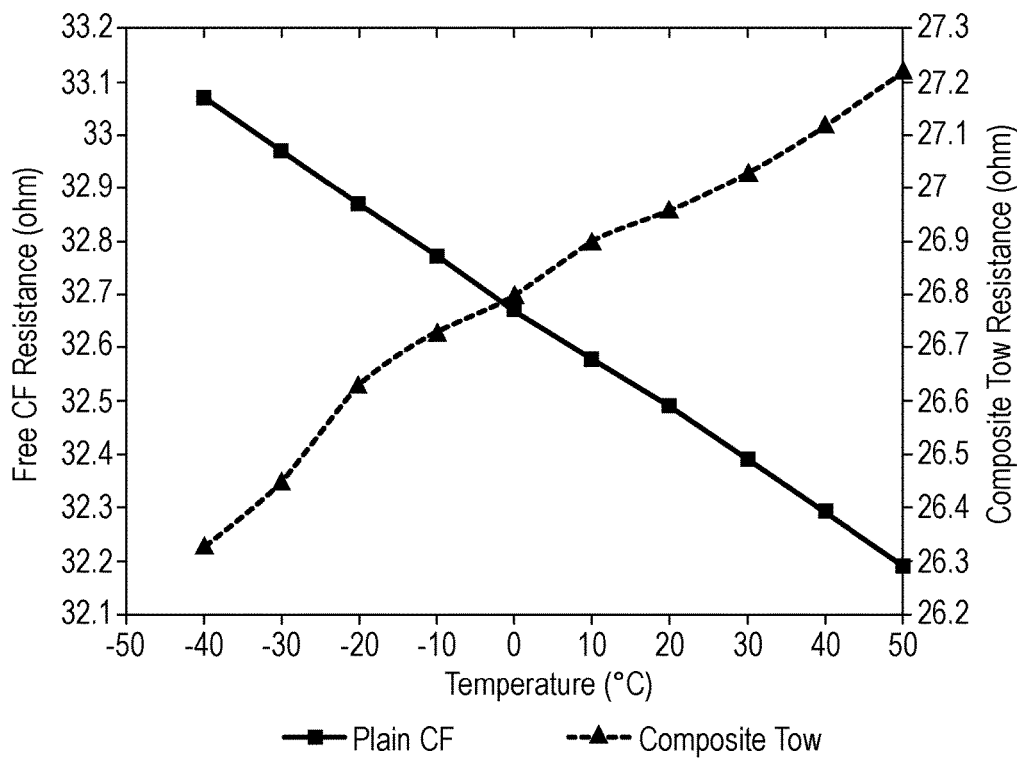
FIG. 5 is a graphical representation illustrating the TCR response of plain carbon and mixed carbon/nickel plated carbon tows.

Carbon fibre filament with TCR ~+0.03%/° C. and diameter ~6 μm;
Coating material: medium-phosphorous (7-9%) nickel with a TCR of ~+0.03%/° C.;
Method of Coating: Electroless Plating Such nickel-coated fibres are, as mentioned above, known, but are typically used for their electrical properties (e.g. screening). Their use for thermal compensation in strain sensing has not been proposed or suggested. The inventors have performed tests to prove the basic concept, and for one such test, a mixed fibre tow was prepared based on a typical conventional carbon fibre tow of approximately 3000 fibres to which was added a small number (~20) of nickel coated carbon fibres to create a single hybrid tow. The TCR of the resultant tow was measured and compared to the response of an unmodified tow, and the results are illustrated in FIG. 5 of the drawings. It can be seen that the addition of even a small number of metallised fibres in this manner has reversed the TCR response of the mixed fibre tow, and illustrates clearly the underlying principle of various embodiments of the present invention.

Exemplary embodiments of the invention include the use of carbon fibre tows including or comprising a plurality of individually metallised carbon fibres, and any known method of achieving such coating can be employed, as described above. However, as explained above, metallised carbon fibres have previously been suggested for use in respect of their electrical properties and, therefore, the metal coating would in that case be as thick as practically possible, whereas in the present invention, the thickness of the coating is dictated by the desired resistance per unit area, which is likely to be significantly less than in known metallised fibres. In the case of both of the specific examples given above, it will be appreciated by a person skilled in the art that the thickness of the conductive coating will ideally be of the order to 10-100 nm but, again, the present invention is not necessarily intended to be limited in any way in this regard. Modifications and variations to the described embodiments can be made without departing from the scope of the invention as claimed.

What is claimed is:

1. A method of sensing strain in a structural component, the method comprising:
    providing, embedded within said structural component, at least one carbon fibre element extending across a principle plane of the structural component and having ends that are externally accessible of the structural component, the carbon fibre element being a carbon fibre that is coated uniformly along its entire length by a coating of an electrically conductive material, said electrically conductive material having a thermal coefficient of resistance (TCR) which is of opposite sign and substantially equal magnitude to a TCR of said carbon fibre, a thickness of said coating being such that a resistance per unit length of said coating is substantially equal to a resistance per unit length of said carbon fibre;
    measuring an electrical resistance of said carbon fibre element; and
    determining strain in respect of said carbon fibre element based on changes in said electrical resistance thereof.

2. The method according to claim 1, wherein said electrically conductive material exhibits negligible piezoresistance.

3. The method according to claim 1, wherein said electrically conductive material is a metal or a metal alloy.

4. The method according to claim 3, wherein said electrically conductive material comprises nickel.

5. The method according to claim 4, wherein said electrically conductive material comprises a nickel-copper alloy or phosphorous nickel plate.

6. A method of manufacturing a carbon fibre element for a carbon fibre reinforced structural component, the method comprising:
    providing at least one carbon fibre that is sufficiently elongate to extend across a principle plane of the structural component such that its ends are externally accessible of the structural component;
    selecting an electrically conductive coating material having a thermal coefficient of resistance which is of opposite sign and substantially equal magnitude to a thermal coefficient of resistance of said carbon fibre;
    calculating according to a resistivity of said electrically conductive material and a diameter of said carbon fibre a coating thickness that will provide a resistance per unit length of said coating material that is substantially equal to a resistance per unit length of said carbon fibre; and
    applying a coating of said electrically conductive material uniformly along the length of the carbon fibre by applying a coating process to the carbon fibre until a thickness of said coating is substantially equal to said calculated coating thickness.

7. The method according to claim 6, wherein said electrically conductive material exhibits negligible piezoresistance.

8. The method according claim 6, wherein applying said coating comprises applying said electrically conductive material directly to said at least one carbon fibre.

9. The method according to claim 6, wherein said electrically conductive material comprises a nickel-copper alloy or phosphorous nickel plate.

10. The method according to claim 6, wherein applying said coating comprises electroless nickel plating.

11. A carbon fibre element for use in a carbon fibre reinforced structural component, said carbon fibre element comprising:
    a carbon fibre that is sufficiently elongate to extend across a principle plane of the structural component such that its ends are externally accessible of the structural component; and
    a coating of an electrically conductive material applied to said carbon fibre uniformly along its entire length, said coating having a thermal coefficient of resistance that is of opposite sign and substantially equal magnitude to a thermal coefficient of resistance of the carbon fibre, a thickness of said coating being selected such that a resistance per unit length of said coating is substantially equal to a resistance per unit length of said carbon fibre.

12. A carbon fibre reinforced structural component comprising:
    a structural component;
    a carbon fibre embedded in said structural component and extending across a principle plane of the structural component such that its ends are externally accessible of the structural component; and
    a coating of an electrically conductive material applied to said carbon fibre uniformly along its entire length, said coating having a thermal coefficient of resistance that is of opposite sign and substantially equal magnitude to a thermal coefficient of resistance of the carbon fibre, a thickness of said coating being selected such that a resistance per unit length of said coating is substantially equal to a resistance per unit length of said carbon fibre.

* * * * *